United States Patent [19]

Rees

[11] Patent Number: 5,607,032
[45] Date of Patent: Mar. 4, 1997

[54] ROTATABLE SHAFT LOCK APPARATUS

[75] Inventor: Richard W. A. Rees, Auburn Hills, Mich.

[73] Assignee: ITT Automotive, Inc., Auburn Hills, Mich.

[21] Appl. No.: 483,738

[22] Filed: Jun. 7, 1995

[51] Int. Cl.⁶ .................................................. B65H 59/10
[52] U.S. Cl. ............................................. 188/67; 188/265
[58] Field of Search ....................... 297/362.14, 362.12, 297/375, 354.12, 374, 378.11, 367; 188/67, 31, 265, 129; 296/65.1; 248/429, 430; 74/424.8 R, 586, 89.15, 411.5

[56] References Cited

U.S. PATENT DOCUMENTS

| 2,018,825 | 10/1935 | Wood . |
| 2,018,828 | 10/1935 | Bell . |
| 2,596,760 | 5/1952 | Bryant . |
| 3,127,788 | 4/1964 | Martens . |
| 3,339,975 | 9/1967 | Posh . |
| 3,350,135 | 10/1967 | Martens . |
| 3,356,411 | 12/1967 | Hornier et al. . |
| 3,369,841 | 2/1968 | Heyl, Jr. . |
| 3,383,135 | 5/1968 | Posh . |
| 3,398,986 | 8/1968 | Hornier . |
| 4,223,946 | 9/1980 | Kluting . |
| 4,291,914 | 9/1981 | Mizelle . |
| 4,387,926 | 6/1983 | Van Eerden et al. . |
| 4,408,799 | 10/1983 | Bowman . |
| 4,579,386 | 4/1986 | Rupp et al. . |
| 4,589,301 | 5/1986 | Griner . |
| 4,592,591 | 6/1986 | Wiers . |
| 4,630,866 | 12/1986 | McFarlane . |
| 4,669,781 | 6/1987 | Conroy et al. . |
| 4,685,734 | 8/1987 | Brandoli . |
| 4,759,587 | 7/1988 | Bucka . |
| 4,770,465 | 9/1988 | Wiers . |
| 4,782,715 | 11/1988 | Chevance . |
| 4,799,734 | 1/1989 | Périou . |
| 4,824,172 | 4/1989 | Rees . |
| 4,880,084 | 11/1989 | Tanaka et al. ............................. 188/67 |
| 4,881,775 | 11/1989 | Rees . |
| 5,052,752 | 10/1991 | Robinson . |
| 5,219,045 | 6/1993 | Porter et al. ............................. 188/67 |
| 5,222,710 | 6/1993 | White et al. . |
| 5,280,999 | 1/1994 | Jones et al. . |
| 5,299,853 | 4/1994 | Griswold et al. . |
| 5,320,413 | 6/1994 | Griswold et al. . |

Primary Examiner—Douglas C. Butler
Attorney, Agent, or Firm—Thomas N. Twomey; J. Gordon Lewis

[57] ABSTRACT

A lock apparatus selectively locks and unlocks a rotatable shaft from rotation. A brake disc is formed with opposed lock surfaces. First and second lock rings rotatably mounted on first and second bearing members are alternatingly moved by rotation along spaced projections on the adjacent first and second bearing members into locking engagement with the lock surfaces on the brake disc and away from the brake disc to an unlocked position. An outer member of each of the bearing members is held in a fixed position by engagement with first and second end caps mounted on the brake disc. An inner bearing member is axially movable with respect to the outer bearing member to bring bearings disposed in outer and inner races on the outer and inner bearing members into contact with thrust faces on the outer and inner members as axial force is imposed on the rotatable shaft to enable rotation of the shaft.

12 Claims, 6 Drawing Sheets

ROTATABLE SHAFT LOCK APPARATUS

BACKGROUND OF THE INVENTION

1. Field of the Invention

The present invention relates, in general, to linear actuators and, more specifically, for linear actuators for positioning vehicle seat components.

2. Description of the Art

Vehicle seat assemblies are usually provided with a seat adjuster for adjusting the horizontal fore and aft position of an upper track movably mounted in a lower track fixed to the vehicle, and with a seat recliner for adjusting the angular position of a pivotable seat back with respect to a seat cushion. One type of seat adjuster includes a plurality of discrete, spaced positions or detents for releasibly locking the upper track to the lower track.

Another type of seat adjuster which is also usable as a seat recliner utilizes a linear actuator formed of a threadingly engaged lead screw and nut to provide an infinite number of user selectible seat adjustment positions. Various means are utilized to releasibly lock the nut in a fixed position to prevent rotation of the nut and the lead screw so as to fix one of the movable components of the seat in a user selected, adjusted position with respect to other components of the vehicle seat. While the latter described type of linear actuator is capable of providing infinite seat adjustment positions, such a linear actuator still lacks a reliable, smooth release operation, particularly when seat adjustment is made under load, i.e. the user's weight on the seat.

Further, vehicle seat assemblies are either a power driven or a manually operated type. Due to the different functional requirements of a power driven and a manually operated seat adjuster and/or seat recliner, particularly with respect to the common use of spaced detents engaged by a manually operated locking bar in a manually operated seat adjuster, different track assemblies are necessary for each power driven or manually operated seat adjuster and/or seat recliner. This has resulted in a proliferation of different types of seat assemblies which detracts from the advantages attainable by commonality of components for all power driven or manually operated vehicle seat assemblies.

Thus, it would be desirable to provide a linear actuator for a vehicle seat which provides a smooth, reliable lock and lock release. It would also be desirable to provide such a linear actuator for a vehicle seat which provides an infinite number of seat adjustment positions. It would also be desirable to provide a linear actuator for a vehicle seat which enables a common seat assembly design, including the seat tracks and a major portion of the drive mechanism, regardless of whether the seat assembly is power driven or manually operated. Finally, it would be desirable to provide a linear actuator for a vehicle seat which has a simplified construction, reliable operation, a small overall size, low weight and low cost.

SUMMARY OF THE INVENTION

A rotatable shaft lock apparatus includes lock means, mounted on the rotatable shaft, for locking and unlocking the shaft for rotation. The lock means includes a lock member fixedly mounted on the shaft and having first and second lock surfaces. First and second movable members each have a lock surface which is engagable with one of the first and second lock surfaces on the lock member. First and second means are provided for moving the first and second movable members into and out of engagement with the first and second lock surfaces on the lock member. The first and second moving means are each formed of an outer member with an outer race having a thrust face and an inner member with an inner race having a thrust face. The inner member is axially movable relative to the outer member of each of the first and second moving means with bearings interposed between the inner and outer races. Means are engaged with the outer members of the first and second moving means for stationarily fixing the first and second moving means relative to each other. Finally, means are provided for mounting the stationary fixing means to a support.

The lock member preferably comprises a cylindrical member having first and second opposed ends and a through bore extending therethrough. An enlarged flange is formed on the cylindrical member and extends radially outward therefrom, the flange forming the first and second lock surfaces.

In a preferred embodiment, the inner member of each of the first and second moving means is axially movable in response to axial movement of the shaft and lock member to shift the bearings from a first position in which the bearings are spaced from the thrust faces of each of the inner and outer races which prevents the bearings from acting as a thrust bearing to a second position in which the bearings are in engagement with the thrust faces of the inner and outer races permitting rotation of the rotatable shaft under a light axial force.

The moving means preferably comprises complimentary surfaces formed on the first and second movable members and the first and second means for moving the first and second movable members. In an exemplary embodiment, the complimentary surfaces are formed of alternating, circumferentially disposed projections and depressions which engage corresponding projections and depressions on the opposed, facing member to cause axial translation of the first and second movable members relative to the lock surfaces on the lock member.

The stationary fixing means preferably comprises cover means fixedly mounted externally to the first and second bearing members for maintaining the first and second bearing members in a fixed dimensional relationship. Further, the stationary fixing means further comprises first and second end caps mounted on the first and second ends of the lock member, respectively. Means are provided for fixedly coupling each of the first and second end caps to the first and second bearing members, respectively.

At least one tab is formed on and extends radially outward from each of the first and second end caps. The at least one tab engages an aperture formed in the cover to mount the cover to the first and second end caps and to maintain the first and second end caps as well as the first and second bearing members fixed thereto in a axially stationary dimensional relationship.

The lock apparatus of the present invention may be advantageously employed on one or more rotatable shafts in a vehicle seat adjuster. In a vehicle seat adjuster, a rotatable horizontal drive shaft is mounted on an upper track movably disposed relative to a stationarily fixed lower track via a threaded drive nut carried by the lower track and threadingly engaging the rotatable shaft on the upper track. The lock apparatus is mounted on the rotatable shaft and actuated by a cable extending from an actuator lever to move the lock apparatus between the locked and unlocked positions.

The lock apparatus may also be employed on a seat back recliner pivotal drive mechanism which also includes a rotatable shaft carried by the seat adjuster. A linkage interconnects a translatable drive shaft to the seat back recliner frame for pivoting the seat back upon translation of the shaft. The lock apparatus of the present invention is mounted on the shaft and actuated by a cable connected to a remotely located actuator lever. The lock apparatus of the present invention is small and lightweight for a low manufacturing cost and ease of use in various applications. The lock apparatus may be advantageously employed on one or more drive adjustment mechanisms in a vehicle seat adjuster. In such an application, the lock apparatus provides a secure lock of the drive mechanism as well as a smooth and easy lock release for seat adjustment.

BRIEF DESCRIPTION OF THE DRAWING

The various features, advantages and other uses of the present invention will become more apparent by referring to the following drawings in which.

DESCRIPTION OF THE PREFERRED EMBODIMENTS

Referring now to the drawing, and to FIGS. 1–4 in particular, there is depicted a lock apparatus 10 for releasibly locking a shaft 12 from rotation.

Figure 1:
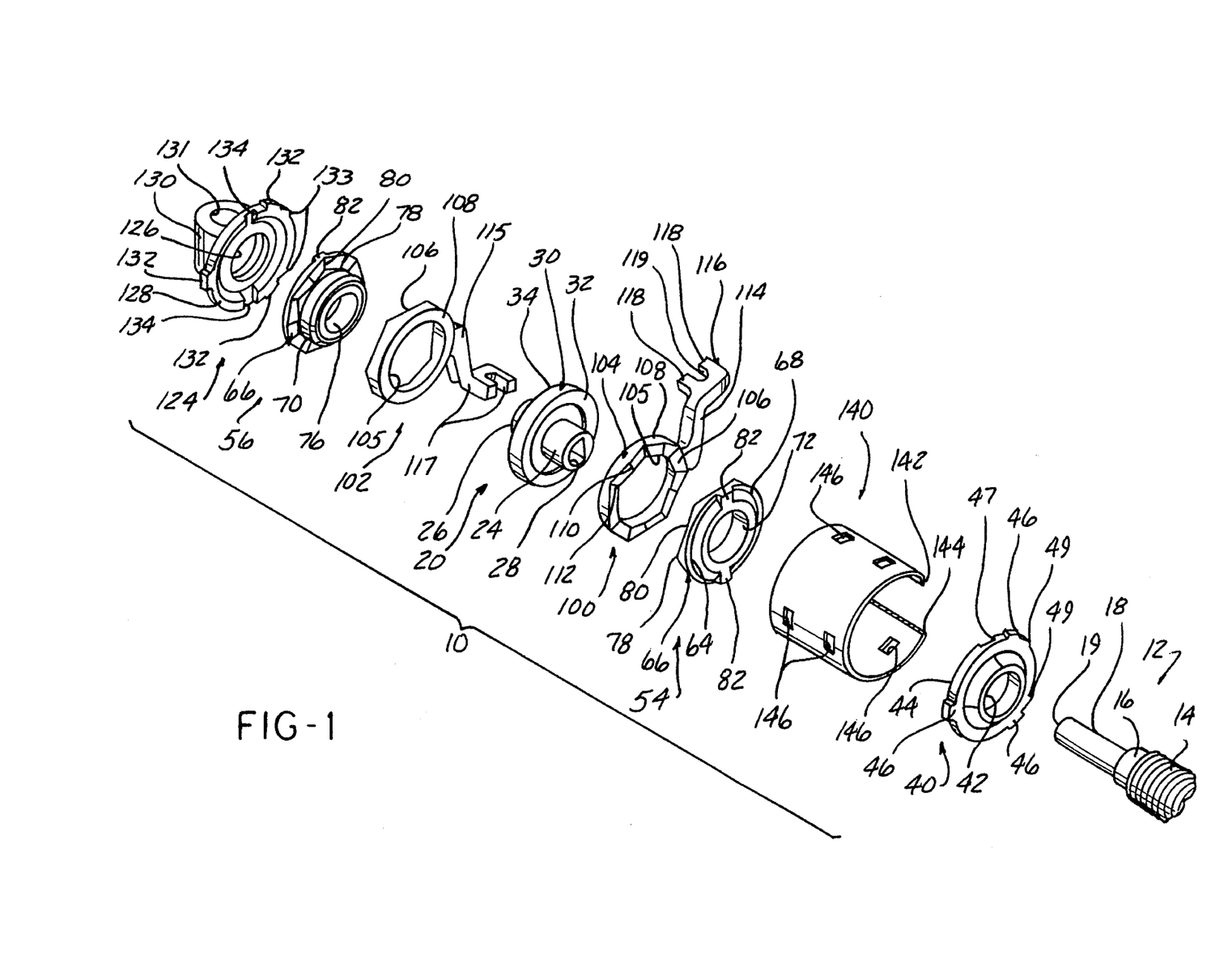
FIG. 1 is an exploded view of the lock apparatus of the present invention.
Figure 2:
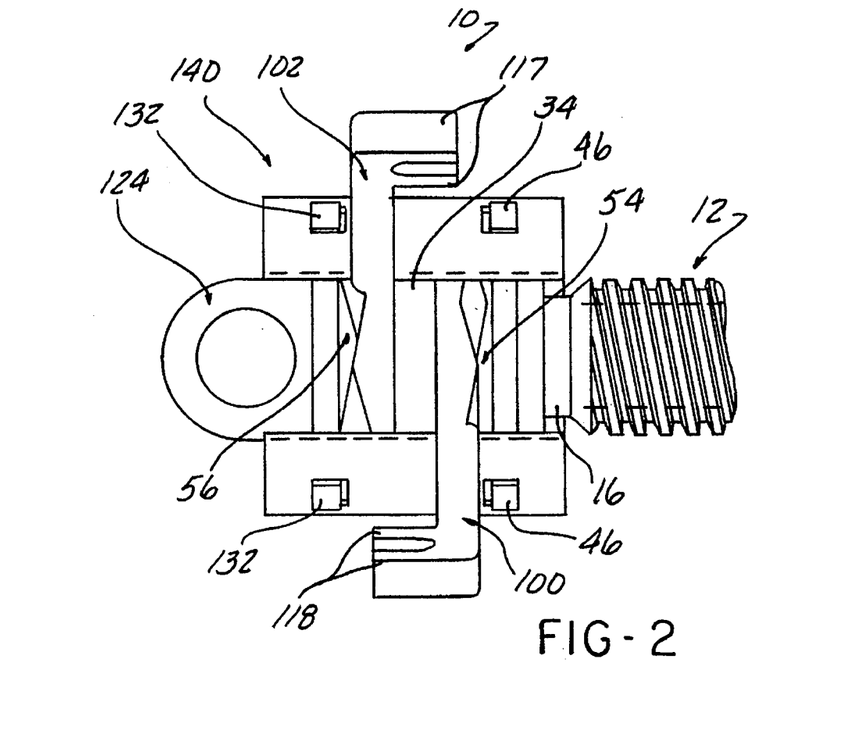
FIG. 2 is a top plan view of the lock apparatus shown in an assembled position.

As shown in FIG. 1, the rotatable shaft 12, by way of example only, is in the form of a threaded shaft or lead screw having a threaded section 14 which terminates in an annular collar 16. One end 18 of the shaft 12 has a D-shape, square shape, etc., for keyed mounting to the lock apparatus 10 as described hereafter.

The lock apparatus 10 includes a centrally located brake disc 20 which is formed of a suitable high strength metal, such as aluminum. The brake disc 20 has a coaxial, generally cylindrical tubular portion which is formed of first and second tubular end portions 24 and 26, respectively. A through bore 28 extends through the tubular portion and has an internal cross section shaped to fixedly and non-rotatably receive the end portion 18 of the shaft 12 with the outer end of the end portion 24 abutting the end of the collar 16 on the shaft 12o An enlarged, centrally located flange 30 is formed on the brake disc 20 and is located centrally between the first and second end portions 24 and 26 of the brake disc 20. The flange 30 forms first and second surfaces 32 and 34, respectively, facing oppositely outward from each other.

A first end cap 40 formed of a suitable metal, such as steel, has a cylindrical shape with a coaxial through bore 42 sized to enable the first end cap 40 to be mounted on the tubular end portion 24 of the brake disc 20. Although not shown in FIG. 1, one end 44 on the first end cap 40 has a concave recess extending from a peripheral end surface to one end of the through bore 42 and forms a seat for a bearing, as described hereafter. A plurality, such as three by way of example only, of radially outwardly extending tabs 46 are integrally formed on and circumferentially spaced about the peripheral edge surface of the first end 44 of the cap 40. The purpose of the tabs 46 will be described in greater detail hereafter. A pair of recesses 47 are also formed in the end 44. Finally, a pair of spaced shoulders 49 are formed in the edge surface, the purpose of which will be described hereafter.

As shown in FIG. 1, the lock apparatus 10 includes first and second identically constructed bearings 54 and 56, respectively. The first and second bearings 54 and 56 are disposed in oppositely facing directions, with the first bearing 54 mounted adjacent to the end 44 of the first end cap 40.

As shown in FIG. 1, and in greater detail in FIGS. 5, 6A, 6B and 6C, each of the first and second bearings 54 and 56, with only bearing 56 shown, is formed of an outer member 58, an inner member 60 and a plurality of ball bearings 62 interposed between the outer and inner members 58 and 60.

Figures 5, 6A, 6B, 6C:
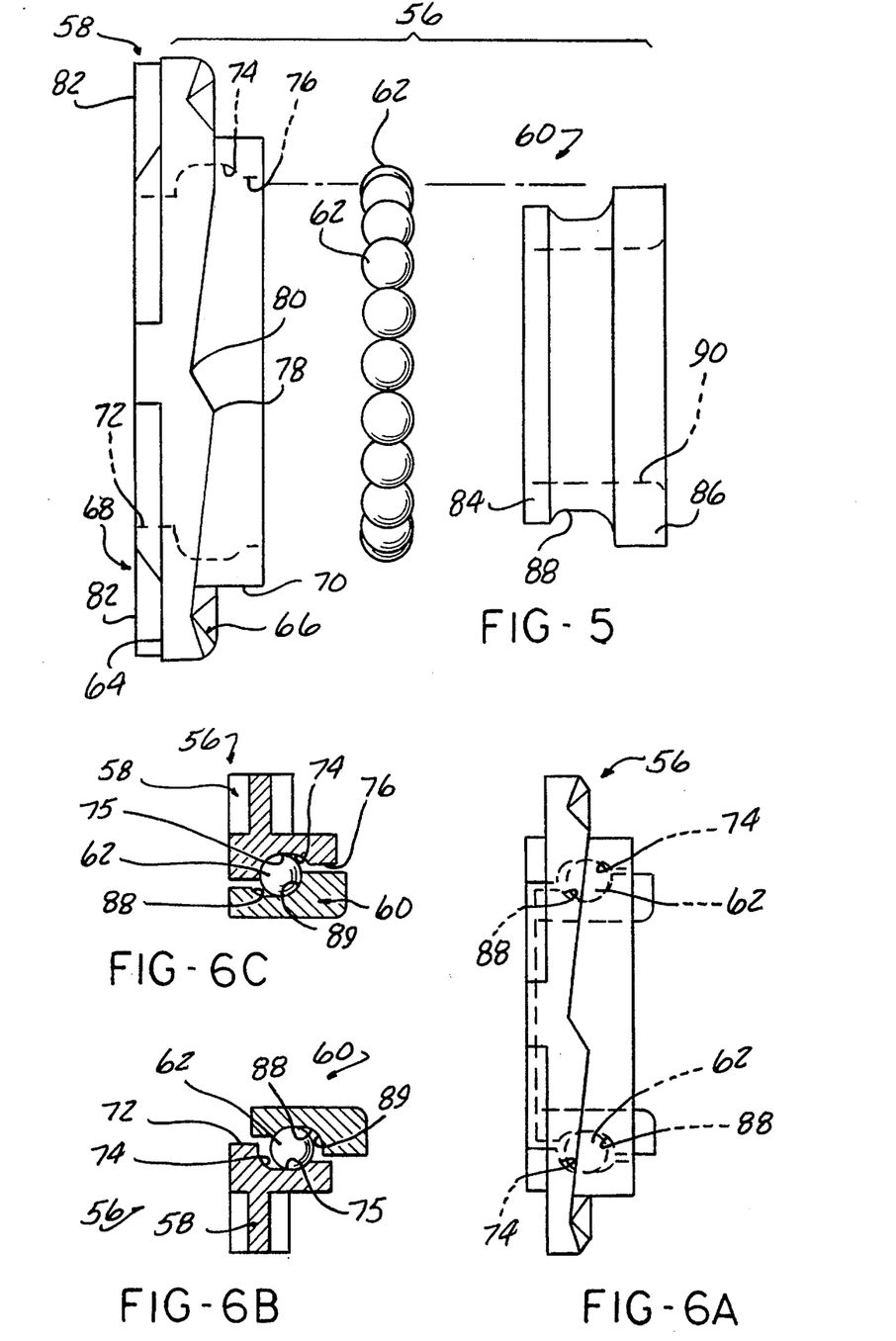
FIG. 5 is an exploded side view of one of the bearing members.
FIGS. 6A, 6B and 6C are side views showing the various operating positions of the components of the bearing members.

The outer member 58 is formed of a suitable plastic material and has an intermediate peripheral flange which forms opposed first and second surfaces 64 and 66. A raised conical portion 68 which extends from the first surface 64. A generally cylindrical portion 70 extends axially outward from the second surface 66. A bore 72 extends from the outer surface of the conical portion 68 through the outer member 58 to an enlarged diameter outer race 74. The opposite end of the race 74 terminates in an enlarged diameter internal bore 76 extending through the end portion 70 of the outer member 58. The outer race 74 has a thrust face 75.

As shown in FIGS. 1, 5, and 6A, the second surface 66 of the second bearing 56 is formed with circumferentially disposed alternating projections and recesses which extend in a uniform manner about the circumference of the second surface 66. By way of example only, the surface irregularities are preferably in the form of alternating peaks 78 and valleys 80.

At least one and preferably a pair of diametrically opposed ribs 82 are formed on and project radially outward from the first surface 64. The ribs 82 engage the complimentarily shaped recesses 47 formed in the end cap 40 to fixedly lock the second bearing 56 to an end cap, described hereafter preventing rotation of the outer member 58 of the second bearing 56.

The inner member 60 of the second bearing 56 is preferably formed of the same plastic material as the outer member 58 and has a first end portion 84 of a first diameter, an opposed, spaced second end portion 86 of a second slightly larger diameter and an intermediate concave inner race 88 formed therebetween. The inner race 88 has a thrust face 89. A through bore 90 extends through the inner member 60 to enable mounting of the inner member 60 about the end portion 24 of the brake disc 20.

The ball bearings 62 are rotatably disposed between the outer race 74 and the inner race 88 and permit rotation of the inner member 60 with respect to the outer member 58 of the first bearing 54.

As described hereafter and shown in FIGS. 6B and 6C, the axial width of the inner race 88 and the outer race 74 is slightly larger than the diameter of the ball bearings 62. This permits a small amount of axial movement of the inner member 60 with respect to the outer member 58 of the second bearing 56.

Figure 3:
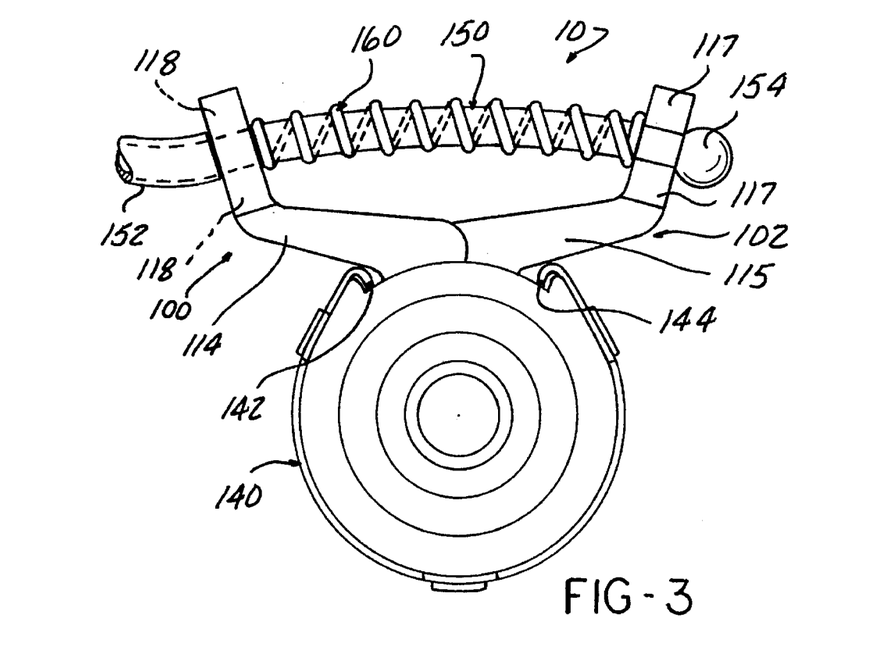
FIG. 3 is a right hand end view of the lock apparatus shown in FIG. 2 along with the actuator and biasing member.
Figure 4:
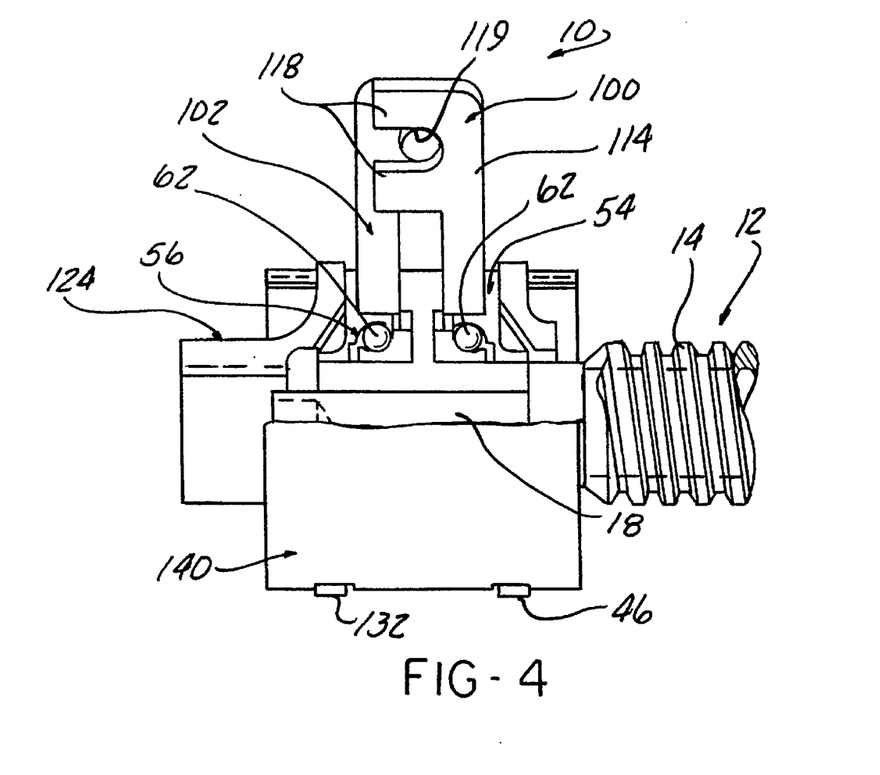
FIG. 4 is a partially broken away, front elevational view of the lock apparatus shown in FIG. 2.

Referring again to FIGS. 1–4, the lock apparatus 10 also includes first and second lock rings 100 and 102, respectively. The lock rings 100 and 102 are identically constructed, but are disposed in opposite axial orientations as shown in FIGS. 1, 3 and 4. Each of the first and second lock rings 100 and 102, such as the lock ring 100, includes an annular body 104 with a through bore 105 extending therethrough sized to rotatably mount over the cylindrical portion 70 of the outer member 58 of the first bearing 54. The annular body 104 has first and second opposed end surfaces 106 and 108, respectively. The first end surface 106 is formed with projections 110 and depressions 112 complimentary to the surface irregularities formed on the respective first or second bearings 54 or 56. As described above for the first and second bearings 54 and 56, the projections 110 and depressions 112 on the first surface 106 are, by way of example only, formed of circumferentially disposed, alternating peaks and valleys also denoted by reference numbers 110 and 112. The portion of the first surface 106 between each circumferentially spaced peak 110 and valley 112 has a generally planar or flat form.

An arm 114 is integrally formed with the annular body 104 and extends angularly outward from one edge portion of the annular body 104 on the first lock ring 100. The arm 114 terminates in an actuator receiving means 116 preferably in the form of a pair of spaced legs 118 which are separated by an open ended slot 119.

The second lock ring 102 has an identical arm 115 which terminates in a pair of spaced legs 117 forming a slot therebetween.

In assembling the components of the lock apparatus 10 described to this point, the first lock ring 100 is mounted on the cylindrical portion 70 of the outer member 58 of the first bearing before the first bearing 54 is mounted on end portion 24 of the brake disc 20. This disposes the second end surface 108 of the first lock ring 100 facing the first lock surface 32 on the flange 30 of the brake disc 20. Next, the first end cap 46 is mounted on the end portion 24 of the brake disc 20. The brake disc 20 is then mounted on the end portion 18 of the shaft 12 by mating engagement between the D-shaped bore 28 in the brake disc 20 and the D-shaped cross section of the end portion 18 of the shaft 12. This fixedly mounts the brake disc 20 to the shaft 12.

At this point in the assembly process, an outer end 19 of the end portion 18 of the shaft 12 may be swaged or otherwise deformed about the outer end of the second end portion 26 of the brake disc 20 to axially fix to the brake disc 20 on the shaft 12 and at the same time maintaining the brake disc 20 and the previously mounted first lock ring 100, first bearing 54 and first end cap 40 on the brake disc 20 and the shaft 12.

Next, the second lock ring 102 is mounted on the second bearing 56 which, in turn is mounted over the second end portion 26 of the brake disc 20. A second end cap 124 is then mounted over the second end portion 26 of the brake disc 20. The second end cap 124, in one embodiment shown in FIG. 1, has a generally disc-shaped body having a through bore 126 extending from a first end surface 128. The bore 126 is sized to permit rotatable mounting of the second end cap 124 to the brake disc 20. A boss 130 is formed on one side of the disc-shaped body and has a bore 131 therethrough for receiving a pin, not shown, which forms a means to attach the lock apparatus 10 and the interconnected shaft 12 in a pivotal manner with respect to a support component, not shown in FIG. 1.

A plurality of circumferentially spaced, radially outward extending tabs 132 are formed on the body of the second end cap 124 generally adjacent to the first end surface 128. A pair of shoulders 133 are formed in the edge of the end cap 124. A pair of diametrically opposed recesses 134 are also formed in the first end surface 128 and engage the ribs 82 formed on the second bearing 56 to fixedly mount the second bearing 56 and the second end cap 124 against relative rotation with respect to each other.

Figure 7:
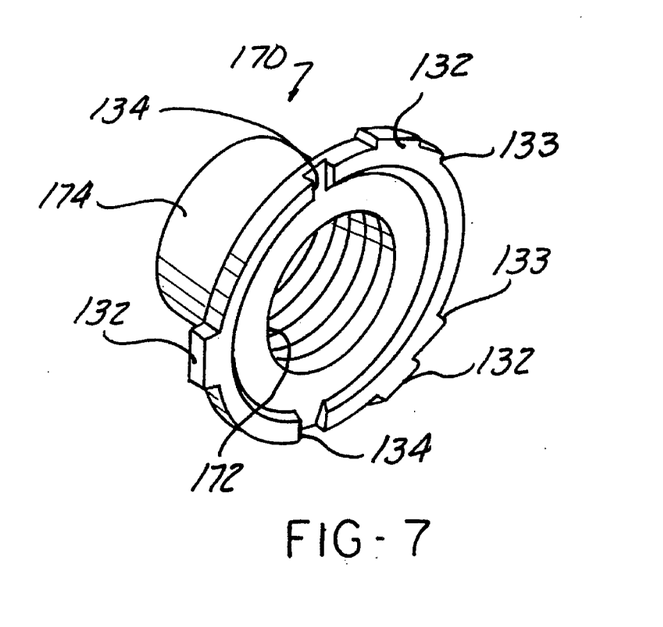
FIG. 7 is an enlarged perspective view of an alternate end cap.

In an alternate embodiment shown in FIG. 7, an end cap 170, instead of the boss 130, may be provided with a threaded internal bore 172 which extends to an outer end of a cylindrical sleeve 174. The bore 172 receives a suitable fastener to fixedly attach the entire lock apparatus 10 to a support structure.

Finally, a cover or housing 140 is mounted about the interconnected components of the lock apparatus 10 described above. The cover 140 is preferably in the form of a thin metallic member, formed from steel, by way of example only, which is bent into a circular shape to surround substantially all of the interconnected components of the lock apparatus 10. The cover 140 has a pair of bent in edges 142 and 144 which engage the shoulders 49 in the end cap 40 and the shoulders 133 in the end cap 124. At least one and preferably a plurality of circumferentially spaced apertures 146 are formed in the cover 140 adjacent each opposed end thereof. The apertures 146 engage the tabs 46 on the first end cap 40 and the tabs 132 on the second end cap 124 to fixedly mount the cover 140 to the first and second end caps 40 and 124 and to retain the end caps 40 and 124, the lock rings 100 and 102 and the brake disc 20 in a fixed, axial, non-rotatable position.

When the lock apparatus 10 is assembled as described above, an actuator 150, such as a flexible steel cable slidably mounted in an exterior sheath 152, may be attached to the actuator receiving legs 118 and 119 on the first and second lock rings 100 and 102, respectively, as shown in FIG. 3. The sheath 152 of the cable 150 abuts the legs 118, with an end portion of the cable 150 extending exteriorly of the sheath 152 through the slot 119 between the legs 118 and the slot formed between the corresponding legs 117 in the second lock ring 102. An enlarged ball 154 is formed at the end of the cable 150 to releasibly hold the cable 150 in the legs 117 on the second lock ring 102.

A biasing means 160, such as a compression spring, is disposed about the end portion of the cable 150 and seats between opposed, inner facing surfaces of the legs 118 and 117 on the first and second lock rings 100 and 102, respectively. The biasing means or spring 160 biases the legs 118 and 117 oppositely outward from each other to what is hereafter referred to as a first, locked position of the lock apparatus 10.

When the lock apparatus 10 is in the first locked position shown in FIG. 3, the first and second lock rings 100 and 102 will be biased to a position bringing the respective peaks 110 on the first end surface 106 of each of the first and second lock rings 100 and 102 into mating engagement with the corresponding peaks 78 on the first and second bearings 54 and 56. This axially moves the first and second lock members 100 and 102 away from the respective first and second bearings 54 and 56 and brings the second end surfaces 108 of the first and second lock rings 100 and 102 into fixed, locked engagement with the opposed surfaces 32 and 34 on the flange 30 of the brake disc 20 thereby locking the brake disc 20 and the shaft 12 connected thereto against rotation.

Figure 8:
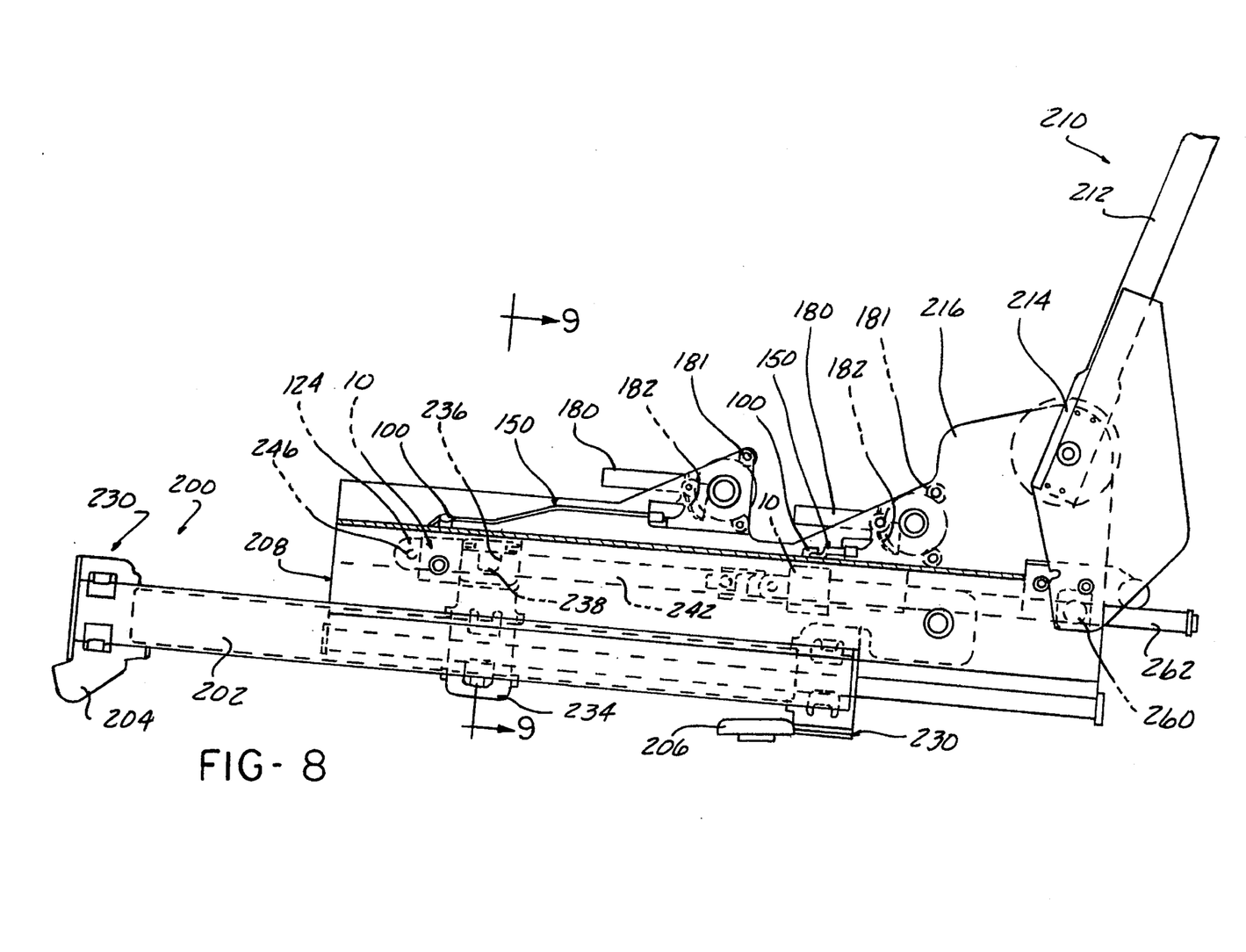
FIG. 8 is a side elevational view of a vehicle seat adjuster utilizing the lock apparatus of the present invention.

Referring briefly to FIG. 8, a release handle or lever 180 is pivotally mounted at an enlarged end to a bracket 181 attached to a support. The sheath 152 surrounding the cable 150 is fixed to the bracket 181, with the cable 150 extending around a flange 182 on the enlarged end of the handle 180 and fixed to the flange 182 or passing to an identical bracket and handle, not shown.

When the release handle 180 is actuated or pivoted, the movement of the handle 180 causes the end of the cable 150 to retract into the sheath 152 and move the spaced legs 118 and 117 of the first and second lock rings 100 and 102 toward each other. This rotates the respective lock rings 100 and 102 to a position bringing the valleys 112 on each of the lock rings 100 and 102 into alignment with the peaks 78 on the adjacent first and second bearings 54 and 56, respectively. This allows the lock rings 100 and 102 to move axially outward from the brake disc 20 to disengage the second surfaces 108 of the first and second lock rings 100 and 102 from the opposed lock surfaces 32 and 34 on the flange 30 of the brake disc 20 thereby unlocking the lock apparatus 10 to permit subsequent rotation of the shaft 12o When no axial load or force is placed on the shaft 12, the ball bearings 62 in each bearing member 54 and 56 are spaced by a small gap from the thrust faces 89 and 75 of the inner and outer races 88 and 74 as shown in FIG. 6A which prevents the bearings 54 and 56 from acting as thrust bearings and prevents rotation of the shaft 12. However, the ball bearings 62 in the first and second bearings 54 and 56 are capable of acting as thrust bearings when, assuming the lock rings 100 and 102 are in the unlocked position, a small axial load is imposed on the shaft 12 moving the shaft 12 in either axial direction.

For example, when an axial load is placed on the shaft 12 moving the shaft 12 to the left in the orientation shown in FIG. 1, as shown in FIG. 6C, such axial load results in a slight movement of the shaft 12 which moves the inner member 60 of both of the first bearing 54 and the second bearing 56 to the left. This movement disposes each ball bearing 62 in the second bearing 56 in direct contact with the thrust faces 75 and 89 of the outer race 88 and the inner race 74. The second bearing 56 now acts as a thrust bearing enabling rotation of the shaft 12 under the axial load imposed on the shaft 12.

At the same time, due to the opposite orientation of the first bearing 54, the ball bearings 62 in the first bearing 54 are not in contact with the thrust faces such that the first bearing 54 is not operative as a thrust bearing.

If an axial load is imposed on the shaft 12 in an opposite direction, or to the right in the orientation shown in FIG. 1, as shown in FIG. 6B, such axial load imposes a slight movement on the shaft 12 to the right thereby shifting the inner member 60 of the first and second bearings 54 and 56 to the right. This disposes each ball bearing 62 in the second bearing 56 out of contact with at least one of the thrust faces, such as thrust face 89, to prevent the second bearing 56 from acting as a thrust bearing.

However, the rightward movement of the inner member 60 of the first bearing 54 to a position identical to that shown in FIG. 6C, placed the ball bearings 62 in the first bearing 54 in contact with both thrust faces 89 and 75 such that the first bearing 54 acts as a thrust bearing enabling rotation of the shaft 12 under the axial load.

Figure 9:
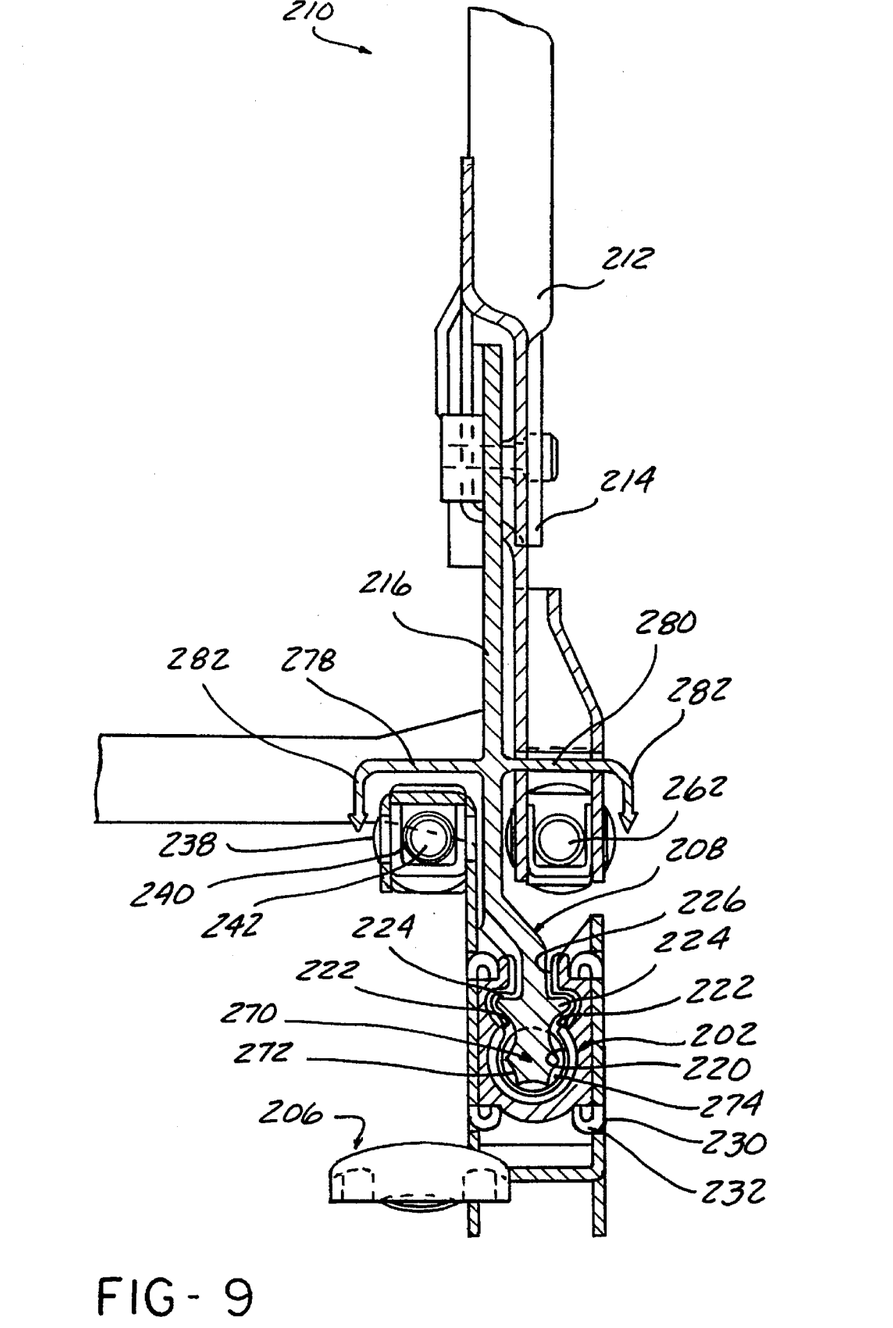
FIG. 9 is a cross sectional view taken generally along line 9—9 in FIG. 8.

Referring now to FIGS. 8 and 9, there is depicted an exemplary application of the lock apparatus 10 described above in a vehicle seat adjuster. By way of background, a typical vehicle seat adjuster includes a pair of track assemblies, with only one track assembly 200 being depicted in FIGS. 8 and 9. The track assembly 200 includes a lower track or rail 202 which is fixedly mounted on a vehicle floor by means of suitable seat attachment supports 204 and 206. An upper track 208 is slidably mounted to the lower track 202 and is horizontally movable fore and aft with respect to the lower track 202.

As shown in FIG. 9, the lower track 202 is formed of an elongated, channel-like extrusion with a lower longitudinally extending bore 220. A pair of spaced notches 222 are formed at one end of the bore 220 and open to a pair of recesses 224 which close to a slot 226 receiving the upper track 208 therethrough.

In one exemplary form, the upper track 208 includes a bottom portion 270 which is slidably disposed in the bore 220 in the lower track 202. Although the bottom portion 270 may have any shape, such as circular, square, etc., in an exemplary embodiment, the bottom portion 270 of the upper track 208 is formed with a plurality of angularly disposed, arcuate-shaped faces, each denoted by reference number 272. A suitably formed bearing 274 is disposed within the bore 220 and the lower track 202 and in contact with the arcuate faces 272 on the bottom portion 270 of the upper track 208 to provide smooth sliding movement of the upper track 208 within the lower track 202.

Further details concerning the construction and operation of the lower track 202 and the upper track 208 as well as the fingers 224 and notches 222 can be had by referring to U.S. Pat. No. 5,344,114.

As shown in FIG. 9, a pair of oppositely extending flanges 278 and 280 are formed on the upper seat track extension 216. Each flange 278 and 280 terminates in an outer, depending leg 282 which is disposed about and provides a protective cover for the respective threaded shafts 240 and 262, as described hereafter.

A pair of generally U-shaped mounting brackets 230 are disposed at opposite ends of the lower track 202 and interconnect into external notches formed on the lower track 202 by means of bent tabs 232. The mounting brackets 230 support the seat attachment supports 204 and 206 as shown in FIG. 8.

An additional mounting bracket 234 is mounted on the lower track by means of bent in tabs and notches intermediate between the end mounting brackets 230. The intermediate mounting bracket 234, as shown in FIG. 9, has an upper extension which is bent outward and then downward into an inverted U. Spaced slots 236 are formed in the upper portions of the mounting bracket upper extension and receive lugs 238 extending laterally outward from a conventional drive nut 240. The drive nut 240, as is conventional, has an internally threaded bore which threadingly engages a threaded shaft or lead screw 242. In this embodiment, the second end cap 124 is mounted in the lock apparatus 10, with the lock apparatus 10 attached, as described above, to one end of the shaft 242. This end cap 124 enables pivotal movement of the shaft 242 about a pin 246 extending through the end cap 124 to the upper track 208.

As is conventional, sliding movement of the upper track 208 is effected by means of axial force imposed on the upper track 208 which is transmitted to the threaded shaft or lead screw 242. During such rotation of the shaft 242, when the lock apparatus 10 is in the unlocked position as described hereafter, the fixedly mounted drive nut 238 provides horizontal fore and aft translation of the upper track 208 with respect to the fixed lower track-202 in a conventional manner.

The leftmost manually operable lever 180 shown in FIG. 8 which is connected by cable 150 to the lock rings 100 and 102 of the lock apparatus 10 mounted on the shaft 242 moves the lock apparatus 10 between the locked and unlocked positions as described above. When in the unlocked position, the lock apparatus 10 permits the shaft 242 to rotate under axial force imposed on the seat and the upper track 208 to permit sliding movement of the seat and the upper track 208 with respect to the fixed lower track 202. When the seat is in the desired position, release of the lever causes the spring 160 to bias the lock rings 100 and 102 of the lock apparatus 10 to the locked position thereby locking the shaft 242, the upper track 208 and attached seat in a fixed user selected position.

A separate lock apparatus 10 may be provided for a seat back recliner 210 which includes a frame 212 pivotally mounted at opposite lower ends 214 to a seat frame extension 216 extending from the upper track 208. As shown in FIG. 8, a drive nut 260 is mounted by means of a suitable bracket to the upper track 208. The drive nut 260 threadingly engages a threaded shaft 262 which extends axially along the upper seat frame extension 216. A conventional linkage extends between the shaft 262 and the lower end 214 of the seat back frame 212 to convert horizontal translation of the shaft 262 to pivotal movement of the seat back frame 212 in either clockwise or counterclockwise directions depending upon the direction of rotation of the shaft 262.

In this embodiment, the lock apparatus 10 is mounted to one end of the shaft 262 as shown in FIG. 8. A separate release lever 180, shown as the rightmost lever 180 in FIG. 8, is connected to the lock rings 100 and 102 of the lock apparatus 10 to provide selective locking and unlocking of the lock apparatus 10 to permit or prevent rotation of the shaft 262 and thereby pivotal movement or locking of the seat back frame 212.

In this seat adjuster application, each cable 150 extends from a connection to one lock apparatus 10 and release lever 180, as described above, to a similar connection to another lock apparatus, not shown, mounted on opposite shafts 242 or 262 for simultaneously locking and unlocking each shaft 242 or 262 in response to the portion of the respective release lever 180 and lock apparatus 10.

What is claimed is:

1. A rotatable shaft lock apparatus comprising:

a rotatable shaft;

lock means, mounted on the shaft, for locking and unlocking the shaft for rotation, the lock means including:

a lock member fixedly mounted on the shaft and having first and second lock surfaces;

first and second movable members, each having a lock surface engagable with one of the first and second lock surfaces on the lock member;

first and second means for moving the first and second movable members into and out of engagement with the first and second lock surfaces on the lock member, the first and second moving means each having an outer member with an outer race having a thrust face and an inner member with an inner race having a thrust face, the inner member axially movable relative to the outer member, bearings interposed between the inner race of the inner member and the outer race of the outer member;

first and second means, engaged with the first and second moving means, for stationarily fixing the outer members of the first and second moving means against rotation; and means for mounting one of the first and second stationary fixing means to a support.

2. The apparatus of claim 1 wherein the lock member comprises:

a cylindrical member having first and second opposed end portions, a through bore extending therethrough; and an enlarged flange formed on the cylindrical member and extending radially outward therefrom, the flange forming the first and second lock surfaces.

3. The apparatus of claim 1 wherein:

the inner members of the first and second moving means engage the lock member and are movable in response to axial movement of the lock member and the shaft connected thereto between a first position in which the bearings are spaced from the thrust faces of both of the outer and inner races preventing rotation of the shaft and a second position in which the bearings are engaged with the thrust faces of the outer and inner races to enable rotation of the rotatable shaft under the axial movement thereof.

4. The apparatus of claim 1 wherein the moving means comprises:

complimentary formed surfaces on the outer members of the first and second moving members having alternating, circumferentially disposed projections and depressions engagable with complimentary projections and depressions on the first and second movable members on movement of the first and second movable members relative to the first and second moving means.

5. The apparatus of claim 4 further comprising:

actuator means, connected to the first and second movable members, for moving the first and second movable members between a first position in which the complementary surfaces on the first and second movable members and the first and second moving means axially move the first and second movable members in a direction bringing the lock surfaces of the first and second movable members into locking engagement with the first and second lock surfaces, respectively, on the lock member, and a second position in which the lock surfaces on the first and second movable members are spaced from the first and second lock surfaces on the lock member permitting rotation of the lock member and the shaft connected thereto.

6. The apparatus of claim 5 further comprising:

means for normally biasing the first and second movable members to the first position.

7. The apparatus of claim 1 wherein the first and second stationary fixing means comprises:

first and second end caps mounted on the first and second ends of the lock member, respectively; and means for fixedly coupling the first and second end caps to the outer members of the first and second moving means, respectively.

8. The apparatus of claim 7 wherein the first and second stationary fixing means further comprises:

cover means, fixedly mounted externally to the first and second end caps, for maintaining the first and second end caps and the outer members of the first and second moving means in a fixed dimensional relationship.

9. The apparatus of claim 8 further comprising:

at least one tab formed on and radially extending outward from each of the first and second end caps; and a plurality of apertures formed in the cover means and engagable with the at least one tab on each of the first and second end caps for mounting the cover means to the first and second end caps.

10. The apparatus of claim 1 wherein the lock apparatus is mounted on a seat adjuster, the seat adjuster comprising:

a track assembly including an upper track slidable with respect to a lower track;

a threaded shaft mounted on the upper track;

a drive nut rotatably mounted on the shaft and fixedly connected to the lower track for effecting translation of the upper track with respect to the lower track upon rotation of the threaded shaft; and an actuator lever, mounted on the track assembly for moving the lock apparatus between locked and unlocked positions; and the lock apparatus mounted on the threaded shaft.

11. The apparatus of claim 1 wherein the lock apparatus is mounted on a seat adjuster, the seat adjuster comprising:

a seat back frame pivotally mounted with respect to a seat bottom;

a threaded shaft mounted on the power seat adjuster;

a drive nut engaging the threaded shaft for effecting axial translation of the shaft upon rotation of the shaft;

a linkage connected to the threaded shaft and the seat back frame for converting axial translation of the threaded shaft to pivotal movement of the seat back frame;

the lock apparatus mounted on the threaded shaft; and an actuator lever, mounted on the seat adjuster and connected to the lock apparatus for moving the lock apparatus between locked and unlocked positions.

12. A lock apparatus for a rotatable shaft having an end comprising:

a brake member having first and second end portions and a throughbore extending therethrough fixedly mountable on an end of a rotatable shaft, an enlarged flange formed on the brake member between the first and second end portions and extending radially outward therefrom, the flange forming first and second opposed lock surfaces;

first and second bearing members, each formed of an outer member having an outer race with a thrust face and an inner member having an inner race with a thrust face, the inner member engaged with one of the first and second end portions of the brake member and axially movable relative to the outer member, bearings interposed between the outer and inner races;

first and second lock rings rotatably mounted on the outer member of the first and second bearing members, respectively, each having a first lock surface releasably engagable with the first and second lock surfaces on the brake member and an opposed second surface;

complimentary formed surfaces on the outer members of the first and second bearing members having alternating, circumferentially disposed projections and depressions engagable with complimentary projections and depressions on the first surface of the first and second lock rings on rotation of the first and second lock rings relative to the first and second bearing members;

first and second end caps mounted on the first and second end portions of the brake member, respectively;

means for fixedly coupling the first and second end caps to the outer members of the first and second bearing members, respectively;

means, fixedly mounted to the first and second end caps, for maintaining the first and second end caps and the outer members of the first and second bearing members in a fixed dimensional relationship;

actuator means, connected to the first and second lock rings, for moving the first and second lock rings between a first position in which the complementary surfaces on the first and second lock rings and the first and second bearing members cooperate to axially move the first and second lock rings toward the flange on the brake member bringing the first surfaces of the first and second lock rings into locking engagement with the first and second lock surfaces, respectively, on the brake member, and a second position in which the first surfaces of the first and second lock rings are spaced from the first and second lock surfaces on the brake member permitting rotation of the brake disc; and wherein the inner members of the first and second bearing members are movable in response to axial movement of the lock member and a shaft connected thereto between a first position in which the bearings are spaced from the thrust faces of both of the outer and inner races and a second position in which the bearings are engaged with the thrust faces of the outer and inner races to enable rotation of the rotatable shaft under the axial movement thereof.

\* \* \* \* \*